United States Patent [19]
Zagar

[11] Patent Number: 5,857,505
[45] Date of Patent: Jan. 12, 1999

[54] ROOT AND STUMP CUTTER

[76] Inventor: Frank G. Zagar, 35702 Ridge Rd., Willoughby, Ohio 44094

[21] Appl. No.: 947,702

[22] Filed: Oct. 9, 1997

Related U.S. Application Data

[63] Continuation-in-part of Ser. No. 739,802, Oct. 30, 1996, abandoned.

[51] Int. Cl.$^6$ ........................................ A01G 23/06
[52] U.S. Cl. .................. 144/24.12; 30/296.1; 30/379; 37/302; 144/134.5; 144/142; 144/218; 144/334; 144/241; 407/48; 407/113
[58] Field of Search ............................ 407/45, 48, 29.13, 407/30, 52, 55, 62, 113, 51; 30/379, 276.1; 37/302; 144/24.12, 218, 334, 241, 219, 134.5, 142, 134.1

[56] References Cited

U.S. PATENT DOCUMENTS

| | | |
|---|---|---|
| 1,000,526 | 8/1911 | Lammel . |
| 2,671,478 | 3/1954 | Anderson et al. . |
| 2,923,332 | 2/1960 | Osmun . |
| 2,940,487 | 6/1960 | O'Neill et al. ........................ 144/24.12 |
| 3,004,568 | 10/1961 | Wachtel . |
| 3,009,494 | 11/1961 | Hinkley ................................. 144/24.12 |
| 3,123,112 | 3/1964 | Hodges et al. ........................ 144/24.12 |
| 3,656,521 | 4/1972 | Czerniewicz ............................ 144/219 |
| 3,718,958 | 3/1973 | Bruckner ................................. 144/218 |
| 3,979,827 | 9/1976 | Anzur . |
| 4,554,957 | 11/1985 | Zayat . |
| 4,697,625 | 10/1987 | Bolton . |
| 4,738,291 | 4/1988 | Isley ....................................... 144/241 |
| 4,757,848 | 7/1988 | Mollberg, Jr. . |
| 4,770,219 | 9/1988 | Blackwell ............................... 144/241 |
| 4,783,914 | 11/1988 | Bowling . |
| 4,865,093 | 9/1989 | Ford et al. ............................. 144/137 |
| 5,002,104 | 3/1991 | Stewart . |
| 5,034,407 | 7/1991 | Hooser . |
| 5,063,731 | 11/1991 | Hull et al. . |
| 5,109,656 | 5/1992 | Zimmer . |
| 5,365,725 | 11/1994 | McCance . |

*Primary Examiner*—W. Donald Bray
*Attorney, Agent, or Firm*—Pearne, Gordon, McCoy & Granger LLP

[57] ABSTRACT

A depth-of-cut bushing is mounted above a cutter-arm array to provide a cutting head mounted on a rotary lawn mower or mower/trimmer. The bushing is shaped so that it acts together with the cutter-arm array to accomplish control of the cutting action. This control enables chipping of stumps or roots at the low horsepowers available with lawn mowers or mower/trimmers.

16 Claims, 2 Drawing Sheets

ROOT AND STUMP CUTTER

This application is a continuation-in-part of application Ser. No. 08/739,802 filed Oct. 30, 1996, now abandoned.

This invention relates to cutters or chippers for roots and stumps, and particularly to cutters or chippers capable of performing effectively at relatively low horsepowers typical of small rotary powered lawn mowers or "trimmer/mowers" and the like.

BACKGROUND

Many proposals have been made for attachment of rotary cutters to lawn mowers and other small powered garden tools for use as stump cutters or chippers. In general, however, satisfactory results are not obtainable at the small power inputs provided by such garden tools, say 3 or 4 hp. The cutters tend to bite into the wood and stall. This can to some extent be avoided by gingerly manipulating the cutter head in an attempt to control the depth of cut, but that is difficult to do, particularly since the cutter is located under the power tool and out of the user's direct line of vision.

Successful stump and root cutters are generally driven by much more powerful engines, commercial units for example often running say 35 or 50 hp. The present invention can be also be used with such higher horsepower drives, if desired.

THE PRESENT INVENTION

The present invention provides a root and stump cutter which may consist of a lawn mower or mower/trimmer chassis and motor driving an attachment capable of efficiently chipping a stumps or roots under relatively low power, say 3.5 hp.

The invention combines a cutter-arm array with a very simple control device which acts to control and limit the engagement of the cutters with the workpiece in such a way as to avoid stalling even under relatively low power. The invention also allows the user to "feel" the progress of the cutters and their relation to the stump or root being chipped in such a way as to make it easy to progressively grind down the workpiece object in an efficient manner even though the user cannot directly view the engagement between the cutting head and the workpiece.

The control device combined with the cutter-arm array is simply a depth-of-cut bushing which is mounted closely above and concentric with the cutter-arm array, and whose periphery near the cutter-arm array may have a major diameter about equal to or preferably slightly less than the major diameter of the imaginary surface of revolution generated by the rotating cutter arm array. The combination of the cutter-arm array and the depth-of-cut bushing provide a cutting head which, with the lawn mower or mower/trimmer drive, makes an effective low-horsepower tool for root and stump chipping.

The objects and advantages of the invention will be better understood from the following detailed description of the invention.

THE DRAWINGS

In the drawings, FIG. 1 is a side-elevation sketch of a mower/trimmer of one well known type in connection with which the invention may be employed, with the upper portion of the handle broken away.

FIG. 2 is a side elevation on a much larger scale of a cutting head comprising a cutter-arm array combined with a depth-of-cut bushing as contemplated by the invention; the cutter is diagrammatically shown as in driven relation with a power take-off pulley or attachment-driver of the mower/trimmer of FIG. 1, such driver being indicated in phantom view FIG. 3 is a bottom plan view of the combined cutter-arm array and depth-of-cut bushing, taken on the same scale as FIG. 2, and party cut away to show the end of one of the cutter arms in section.

DETAILED DESCRIPTION

Figure 1:
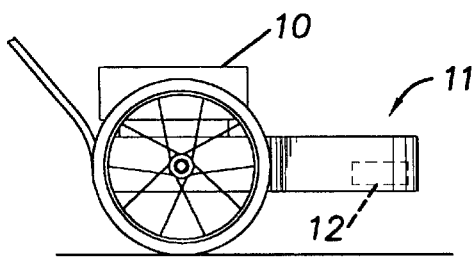

Shown in FIG. 1 is one well known type of mower/trimmer lawn and garden tool (such as a "DR" brand mower/trimmer). The mower/trimmer is provided with a motor within the housing 10 driving a vertical power shaft (not shown) which is coupled by a v-belt drive (not shown) to a power take-off pulley or attachment-driver 12 mounted for rotation on a vertical axis at the "nose" 11 or forwardly protruding narrow front of the machine. The v-belt drive is preferably of a well-known disengageable type.

Such pulley, or substitute hubs or drivers, are adapted to drive attachments for various tasks in lawn and garden care, such as string trimmers, lawn cutting blades, rotary saws for cutting down heavy brush and small trees, and the like.

Figure 2:
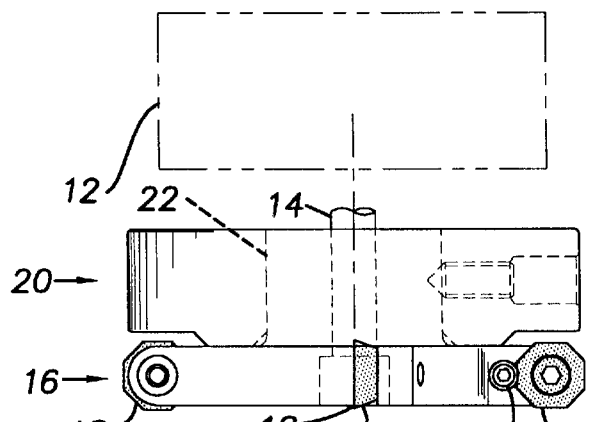

According to the illustrated example of the present invention, the power take-off is coupled via a shaft 14 to drive the cutter-arm array 16 seen in FIG. 2. This shaft may be the shank of a carriage bolt type fastener threadedly engaged in the hub of the pulley 12. The upper or first part of this shank is associated with the power take-off, i.e., with the power input to the shank. The lower part is associated with the power output from the shank or shaft to the cutter-arm array.

Figure 3:
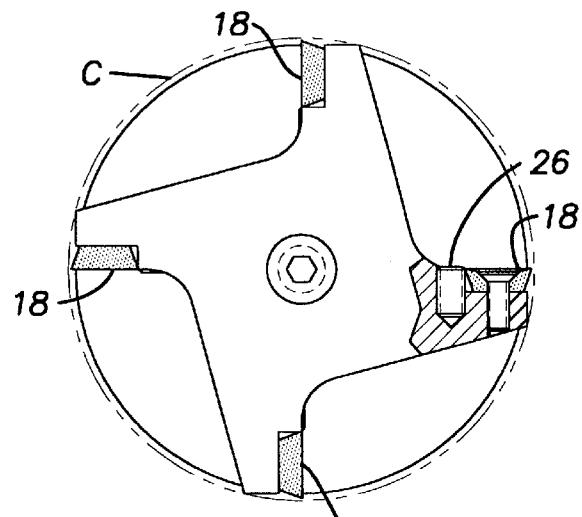

The cutter-arm array includes a circular array of cutters 18 supported on the cutter arms at substantially equal radial distances from the axis of the cutter arm array 16, which is coaxial with the shaft or shank 14. When the cutter-arm array is driven by the drive shaft, the cutters generate an imaginary surface of revolution of a given major diameter, say 4 inches, equal to the diameter of the imaginary circle C in FIG. 3.

A depth-of-cut bushing 20 surrounds and is centered on the axis of the drive shaft 14 and is vertically located close to and above the cutter-arm array 16 and below the upper or first part of the shank 14, i.e. the part that is associated with the power input to the shank. The periphery of the bushing 20 near the cutter-array, i.e. at the lower part of the bushing, has a major diameter of a given dimension which is not less than about 95% of the major diameter of the surface of revolution generated by the array of cutters—say for example 3.875 inches for the bushing compared to 4 inches for the cutter array, so that the former is just under 97% of the latter. Less preferably, such major diameter associated with the bushing equals such major diameter associated with the array of cutters, or still less preferably exceeds the same. If such major diameter associated with the bushing does exceed such major diameter associated with the array of cutters, such excess is preferably less than 5%. Generally, the greater such excess, the less advantageous, as more fully discussed below.

The bushing 20 is cylindrical in shape as shown in FIGS. 2 and 4–6. In some aspects of the invention, the bushing may have other shapes and still provide the guiding and control actions to be described below. For example, the bushing may taper outwardly or inwardly from the major diameter of the lower periphery to provide a frustoconical surface which increases or decreases in diameter with height. Or the bushing may be a relatively thin but preferably stiff disc having relatively little vertical dimension.

Figure 8:
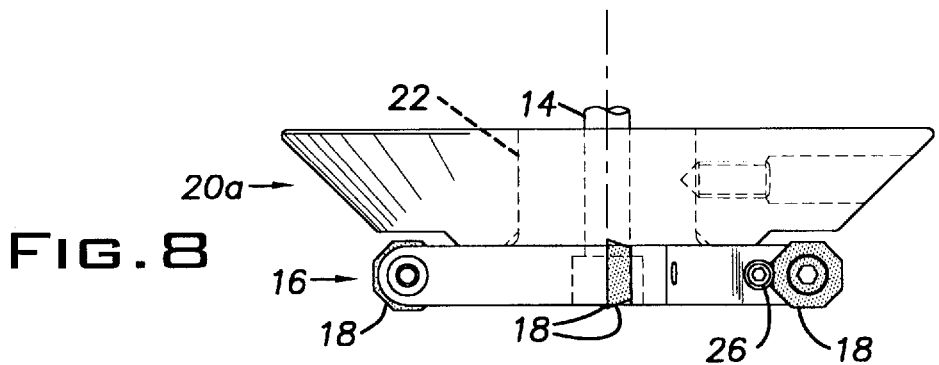
FIG. 8 is a view similar to FIG. 2 showing a presently preferred form of cutting head.

A presently preferred form of bushing is one that tapers outwardly from the major diameter of the lower periphery to provide a frustoconical surface which increases in diameter with height, as for example the bushing 20a in FIG. 8. The bushing 20a may be similar to the bushing 20 as just described, except that the bushing 20a has a frustoconical shape as illustrated.

The bushing 20 (or 20a) may be received on a hub 22 fixed to the cutter-arm array 16, and may be keyed for rotation with the hub and cutters, as by a set screw as illustrated. Suitable spacers (not shown) may be provided above the bushing 20 and between it and the driver or pulley 12. It is preferred that the bushing rotate with the cutter-arm array as just described, but the bushing instead may be stationary, being keyed against rotation by some connection (not shown) to the chassis of the mower/trimmer, or simply allowed to turn as it may on the hub 22.

It is preferred that the surface of the bushings be smooth and uninterrupted, but notches or other discontinuities may be present, particularly if the bushing is stationary or free of rotative connection with the drive.

Figure 4:
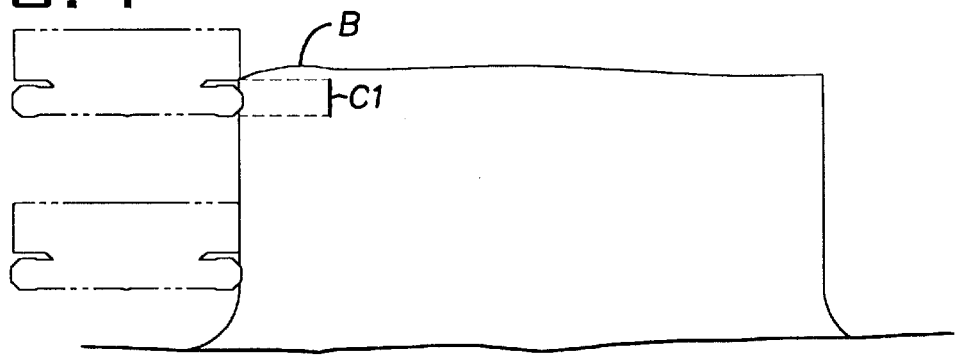
FIG. 4 is a schematic showing at half the scale of FIGS. 2 and 3 showing the cutting head of those figures at different positions relative to a stump.

Some aspects of the operation of the cutter with the cylindrical bushing 20 in stump chipping are illustrated in FIG. 4. In the lower position of the cutter and bushing combination or subassembly, the cutters are prevented by the bushing from digging into the side of the stump more than say about an eighth of an inch. When the subassembly is raised to the higher position illustrated, it becomes possible to engage the stump top to the full depth of the cutters, but substantially no deeper that. While the action is not fully understood, it is to be noted that the spinning array of cutter arms and cutters cannot be forced vertically downward into the wood because of interference by the arm bottoms or the bottom face of the cutter-arm array. At the same time, the cut cannot be made progressively deeper while moving the cutting head in the advancing direction because the then-leading side of the bushing prevents advancing if the cut becomes more than slightly deeper than the cutters themselves.

Whatever the precise action may be, and despite the lack of a direct view of the cutting head, even an inexperienced user can quickly get the "feel" of using the low horsepower device to chip the wood away at a good pace by back and forth motion of the cutting head to accomplish generally horizontal cuts without stalling, as illustrated in FIG. 4 by showing an ideal phantom cut across the top of the stump. A natural way to proceed is to swing the head of the mower/trimmer which contains the drive pulley 12 from one side to the other of the stump to make a cut, and then back to make another cut, perhaps advancing or retracting the mower/trimmer a few inches between cuts to complete cuts at one level before cutting the next lower level. Or, the part of the stump nearest the user may be chipped down through several layers before advancing to the next part of the stump. Combinations of these approaches may be used. All during these operations, the interaction of the depth-of-cut bushing, the cutter-arm array and the work is such as to allow chipping to proceed without the cutters engaging the wood in such a way as to stall the low horsepower drive.

Figure 9:
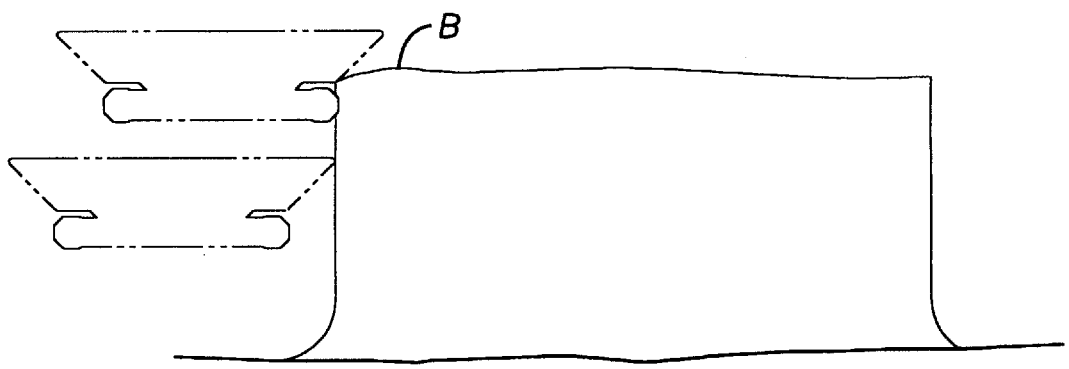
FIG. 9 is a view similar to FIG. 4 showing the cutting head of FIG. 8 at different positions relative to a stump.

The operation of the cutter with the frustoconical bushing 20a is similar to that just described. However, as seen in FIG. 9, in the lower position of the cutter and bushing combination or subassembly, the cutters are prevented by the frustoconical bushing from touching the stump at all. More importantly, when the subassembly is raised to the higher position illustrated, and becomes possible to engage the stump top to the full depth of the cutters, the guiding action of the frustoconical bushing during cutting may under many circumstances be smoother and easier than when a cylindrical bushing is used.

Figure 7:
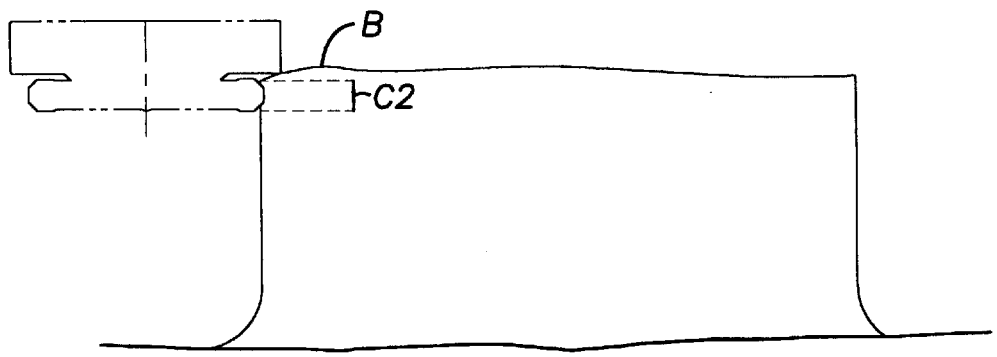
FIG. 7 is a view similar to FIG. 4 showing another cutting head in cutting engagement with a stump.
Figure 10:
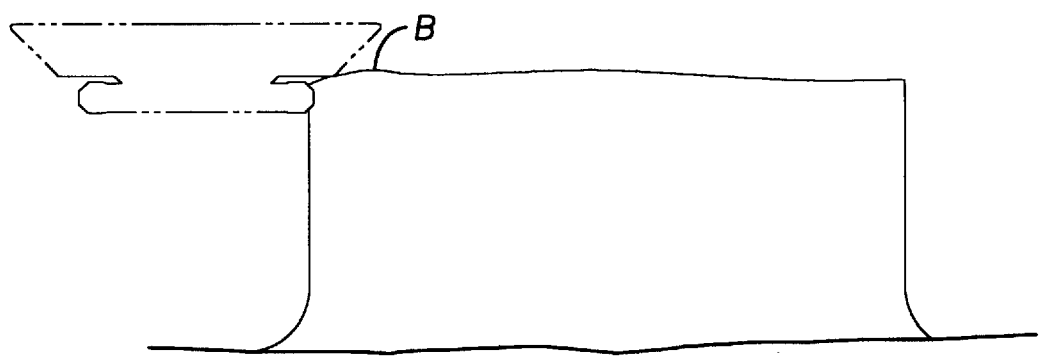
FIG. 10 is a view similar to FIG. 9 showing another cutting head in engagement with a stump.

As previously mentioned, whether the bushing is cylindrical, frustoconical or of other shape, the major diameter of its lower part may equal the major diameter of the surface of revolution generated by the cutter array, or even less preferably may exceed it. FIG. 7 shows a cutter and bushing subassembly where the latter is true for a cylindrical bushing, and FIG. 10 shows the same for a frustoconical bushing. As also previously mentioned, generally the greater the excess diameter of the lower part of the bushing, the less advantageous. In general, the greater such excess, the poorer the chip clearing action of the cutters, the more awkward the guiding action of the bushing, the more metal is used to no added advantage in the fabrication of the tool, and the poorer the visibility of the chipping site. Additionally, as should be evident from FIGS. 7 and 10, when the leading edge of the excess-diameter or protruding bushing encounters a rising slope or a bump such as the bump B, the cutting depth tends to be limited more than it is when the stump surface is level or slopes downwardly; generally the greater the degree of protrusion of the bushing, the greater such disproportion between cutting depths on (1) rising and (2) level or falling slopes. Such disproportion does not exist, or exists to a more limited degree, when the bushing is not protruding, as in FIGS. 4 and 9. Thus, for example, the initial cutting depth C1 in FIG. 4 may generally continue to apply as cutting progresses across the width of the stump whether the slope being encountered is rising, level or falling. In contrast, the initial cutting depth C2 in FIG. FIG. 7 is considerably shallower than depth C1 because the protruding bushing rides on the bump B. This effect would be even greater if the degree of protrusion of the bushing were greater.

The shape and dimensioning of the cutters need not be precisely accurate, as would be the case if they were used in machine tool applications, but they are preferably tungsten carbide tools of a hardness comparable to machine tool cutters and capable of resisting wear even when engaging rocks and other objects below ground lever. Chipping may therefore continue below ground level to the extent desired, with the cutters throwing dirt as they may engage it incident to chipping the edge portions of the stump.

Different shapes of cutters may be used, however the octagonal cutters shown in the drawings have been found to be satisfactory and are adapted to be reset from time to time to expose a fresh one of their eight edges. Each cutter may be keyed to its set position by suitable means such as a set screw 26. The cutters may be 5/8" diameter "OECH type" cutters available from Lovejoy Milling Products, Springfield, Vt. (Such cutters perform well, but are made to unnecessarily strict dimensional tolerances since intended for machine tool use.) Obviously, cutters provided from other sources may be used.

The inclusion of a v-belt drive in the drive train for the device is advantageous because the ability of the v-belt drive to "give" or spring and then recover lessens sudden impacts or shocks, as when the cutters engage knots or small stones or the like, and thereby helps to avoid stalling due to impact back-loading.

Figure 5:
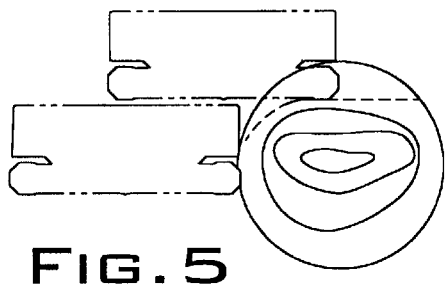
FIG. 5 is a schematic at the same scale as FIG. 4 showing the cutting head at different positions relative to a root.

Some aspects of the operation of the cutter having the cylindrical bushing 20 in root cutting are illustrated FIG. 5. Generally the device operates as described earlier. Due to the curvature of the root sides, the degree of cutting depth allowed by the depth-of-cut bushing becomes progressively greater as the cutting head is raised up the side of the root, finally reaching the height where cutting to the full depth of the cutters is allowed, as illustrated in phantom in the drawing. In root chipping in particular, the capacity of the low horsepower unit to chip below ground level is advantageous. Often it is convenient to chip downward all the way through the root to sever it, and then advance to the next length of root beyond the point of severance, and so proceed along the length of whatever portion of the root is to be removed in each direction. The invention also lends itself to removal of only the protruding top portions of large roots that are not to be completely removed, but simply reshaped for landscaping purposes. In these instances, the invention lends itself to planing off the root tops in a controlled manner even though the action of the cutting head cannot be directly viewed during the process.

The operation of the cutter with the frustoconical bushing 20a in root cutting is similar to that just described.

Figure 6:
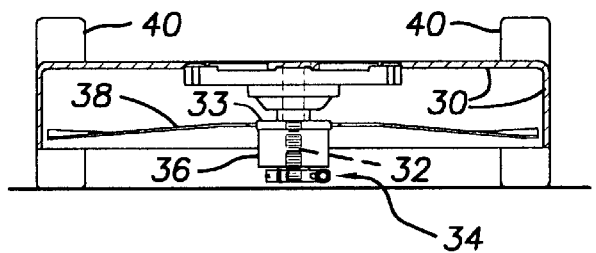
FIG. 6 is a elevational view, in partial cross-section, taken in the forward direction and on a scale larger than FIG. 1 but smaller than FIGS. 4 and 5, showing the invention in use in connection with a rotary mower, and omitting all components above the mower skirt.

While the invention has been described in greatest detail in connection with a "nosed" mower/trimmer type machine, its use with a rotary lawn mower is also illustrated, as seen in FIG. 6. In a rotary mower type machine, the rotary mounting blade is usually protected by a hood or skirt, such as the skirt 30, completely obscuring the underside of the mower from view when in use. Even so, the invention can be uses in the manner describe above, and feedback from the "feel" of the chipping action enables chipping to be accomplished without stalling, albeit without the shock-absorbing inclusion of a v-belt drive since most rotary lawn mowers directly connect the motor to the drive shaft on which the blade is mounted.

In general, the wheels of the mower should be adjusted as low as possible so that the root or stump will be trimmed well below grass height. In mower/trimmers with wheel adjustments, the wheels may also be adjusted as low as possible, but the cutters can also in effect be further lowered by manipulating the machine to angle the "nose" of the machine downward to thereby dip the cutter-arm array to lower levels.

As is typical of rotary motors, the power shaft 32 of the illustrated mower is threaded to receive the hub 33 of a cutter blade 38. A cutter-arm array 34 is driven by the power shaft 32. In this instance, the cutter-arm array comprises three arms and cutters spaced at intervals of 120 degrees, instead of four spaced at 90 degrees as in the embodiment of the earlier figures. The central hole in the cutter-arm array 34 may be tapped to be threadedly received on the power shaft, with the depth-of-cut bushing 36 clamped above the cutter-arm array and between it and the hub of the cutter blade, the bushing acting also as a spacer. As shown in the drawing and as implied by the foregoing, the cutter blade is preferably left in its mounted position to aid in blowing and dispersing the chips produced by the cutters. Other mounting arrangements may be used.

Generally in rotary lawn mowers, the power shaft comes directly out of the mower motor, without an intervening shock-absorbing linkage such as the v-belt drives associated with machines of the mower/trimmer type. The cutter-arm array must be small enough in diameter that the back load will not bend the power shaft if the cutter hits a hidden obstruction. Cutters on small rotary lawn mowers are generally limited by this consideration to a diameter of about four inches for, say, a 5/8 inch diameter power shaft.

In the practice of the invention, modifications may be made which omit or modify elements described above, or add other elements. For example, three cutter arms and three cutters may be employed instead of four, although the latter are presently preferred because experience to date shows the cutting and anti-stalling action to be better with four cutters in combination with the depth-of-cut bushing. The invention is not intended to be limited to the details described above, but to be defined by the following claims, interpreted as broadly as possible consistent with law and validity.

What is claimed is:

1. A root and stump cutter comprising power input means, a generally vertical drive shaft having a central axis and having a first part associated with the power input means and a second part below the first part and associated with power output from the shaft, a cutter-arm array coaxially coupled with said second part of the drive shaft in rotatively driven relationship therewith, a circular array of cutters supported on said cutter arms at substantially equal radial distances from the axis of said cutter arm array, said cutters generating an imaginary surface of revolution of a given major diameter when said cutter-arm array is rotatively driven by said drive shaft, said surface of revolution being coaxial with said cutter-arm array, and a depth-of-cut bushing surrounding said drive shaft axis and vertically located close to and above said cutter-arm array and cutters and below said first part of said drive shaft, said guide bushing being centered on said drive shaft and its periphery close to said cutter arm array having a major diameter of a given dimension, said major diameter of said surface of revolution of said cutters and said major diameter of said bushing periphery differing by less than five percent.

2. A root and stump cutter as in claim 1 in which said major diameter of said surface of revolution of said cutters exceeds said major diameter of said depth-of-cut bushing periphery.

3. A root and stump cutter as in claim 1 in which said guide bushing rotates with said drive shaft and said array of cutter arms.

4. A root and stump cutter as in claim 3 in which said guide bushing is smooth-walled.

5. A root and stump cutter as in claim 4 in which said guide bushing is cylindrical in shape.

6. A root and stump cutter as in claim 5 in which said major diameter of said surface of revolution of said cutters exceeds said major diameter of said depth-of-cut bushing periphery.

7. A root and stump cutter as in claim 1, said power input means including a motor and a power transmitting linkage between said motor and said drive shaft, said linkage including a v-belt drive whereby impact back-loads imposed on the linkage are dissipated sufficiently to reduce motor stalling incident to impact back-loading.

8. A root and stump cutter as in claim 4 in which said guide bushing is frustoconical in shape.

9. A root and stump cutter comprising a generally vertical drive shaft having a central axis and having a first part associated with a power source and a second part below the first part and associated with power output from the shaft, a cutter-arm array coaxially coupled with said second part of the drive shaft in rotatively driven relationship therewith, a circular array of cutters supported on said cutter arms at substantially equal radial distances from the axis of said cutter arm array, said cutters generating an imaginary surface of revolution of a given major diameter when said cutter-arm array is rotatively driven by said drive shaft, said surface of revolution being coaxial with said cutter-arm array, and a depth-of-cut bushing surrounding said drive shaft axis and vertically located close to and above said cutter-arm array and cutters and below said first part of said drive shaft, said guide bushing being centered on said drive shaft and its periphery close to said cutter arm array having a major diameter of a given dimension, said major diameter of said bushing periphery being at least about 95% of said major diameter of said surface of revolution of said cutters.

10. A root and stump cutter as in claim 9 in which said major diameter of said surface of revolution of said cutters exceeds said major diameter of said depth-of-cut bushing periphery.

11. A root and stump cutter as in claim 9 in which said guide bushing rotates with said drive shaft and said array of cutter arms.

12. A root and stump cutter as in claim 9 in which said guide bushing is smooth-walled.

13. A root and stump cutter as in claim 12 in which said guide bushing is frustoconical in shape.

14. A root and stump cutter as in claim 13 in which said major diameter of said surface of revolution of said cutters exceeds said major diameter of said depth-of-cut bushing periphery.

15. A root and stump cutter as in claim 9, said power input means including a motor and a power transmitting linkage between said motor and said drive shaft, said linkage including a v-belt drive whereby impact back-loads imposed on the linkage are dissipated sufficiently to reduce motor stalling incident to impact back-loading.

16. A root and stump cutter as in claim 12 in which said guide bushing is cylindrical in shape.

\* \* \* \* \*